(12) United States Patent
Anno et al.

(10) Patent No.: US 6,657,682 B2
(45) Date of Patent: Dec. 2, 2003

(54) TFT-LCD DEVICE HAVING LAMINATED BODY OF LIGHT-SHIELD AND SEMICONDUCTOR BETWEEN PIXEL ELECTRODES

(75) Inventors: Kouichi Anno, Mobara (JP); Tohru Sasaki, Mobara (JP)

(73) Assignee: Hitachi, Ltd., Tokyo (JP)

( * ) Notice: Subject to any disclaimer, the term of this patent is extended or adjusted under 35 U.S.C. 154(b) by 78 days.

(21) Appl. No.: 10/073,965

(22) Filed: Feb. 14, 2002

(65) Prior Publication Data

US 2002/0126239 A1 Sep. 12, 2002

(30) Foreign Application Priority Data

Mar. 9, 2001 (JP) .................................... 2001-066574

(51) Int. Cl.[7] .............................................. G02F 1/136
(52) U.S. Cl. ........................................ 349/44; 257/59
(58) Field of Search ............................ 349/43, 38, 44, 349/110, 111; 257/59, 72

(56) References Cited

U.S. PATENT DOCUMENTS

| | | | |
|---|---|---|---|
| 5,668,649 A | 9/1997 | Suzuki et al. | 349/42 |
| 5,844,255 A | 12/1998 | Suzuki et al. | 257/59 |
| 5,870,157 A * | 2/1999 | Shimada et al. | 349/106 |
| 6,400,427 B1 * | 6/2002 | Hanazawa et al. | 349/44 |

FOREIGN PATENT DOCUMENTS

| | | |
|---|---|---|
| JP | 7-244297 | 9/1995 |
| JP | 11-337926 | 12/1999 |

OTHER PUBLICATIONS

Patent Abstracts of Japan 11–337926 Dec. 10, 1999.

* cited by examiner

Primary Examiner—Toan Ton
(74) Attorney, Agent, or Firm—Antonelli, Terry, Stout & Kraus, LLP (57) ABSTRACT

To achieve elimination of reflection of light due to signal lines, a liquid crystal display device includes a plurality of gate signal lines formed on an insulation substrate, a plurality of drain signal lines formed on the insulation substrate such that the drain signal lines intersect the gate signal lines, thin film transistors connected to the gate signal lines and the drain signal lines, reflection electrodes connected to the thin film transistors, the thin film transistors and the reflection electrodes being formed on pixel regions which are surrounded by the respective signal lines, and sequential laminated bodies, each of which is made of a light shielding film and a semiconductor layer. Each sequential laminated body is formed between the reflection electrode and the reflection electrode of another neighboring pixel region in such a way that the sequential laminated body is superposed on the sides of the reflection electrodes.

11 Claims, 11 Drawing Sheets

TFT-LCD DEVICE HAVING LAMINATED BODY OF LIGHT-SHIELD AND SEMICONDUCTOR BETWEEN PIXEL ELECTRODES

BACKGROUND OF THE INVENTION

The present invention relates to a liquid crystal display device and, more particularly, to an active matrix type liquid crystal display device which functions at least as a reflection type display device.

In an active matrix type liquid crystal display device, on a liquid-crystal-side surface of one of a pair of substrates which are arranged to face each other with a liquid crystal disposed therebetween, regions which are surrounded by gate signal lines extending in the x direction and arranged in the y direction in parallel and drain signal lines extending in the y direction and arranged in the x direction in parallel are formed as pixel regions. A thin film transistor, which is driven by scanning signals (voltage) from a one-sided gate signal line, and a pixel electrode, to which video signals (voltage) are supplied from a one-side drain signal line through the thin film transistor, are provided in each pixel region. The pixel electrode generates an electric field between the pixel electrode and a counter electrode which is formed on the other-substrate side in common with each pixel region so as to control the light transmittivity of the liquid crystal material disposed therebetween.

There is a known liquid crystal display device in which a portion or the whole of each pixel electrode is formed of a metal layer having a high light reflectance. This type of liquid crystal display device functions as a reflection type display device. Since such a liquid crystal display device enables a viewer to recognize images by making use of external light, such as sun light, the power consumption of the device can be reduced. However, so long as a liquid crystal display device is operated to function as a reflection type device, there arises a problem in that a sufficient external light cannot be ensured for every site where the liquid crystal display device is to be used. Accordingly, a device construction which can enhance the numerical aperture becomes more important in this type of display device compared to other kinds of liquid crystal display devices.

The present invention has been made in view of such circumstances, and it is an object of the present invention to provide a liquid crystal display device having a constitution which can enhance the numerical aperture.

Further, it is another object of the present invention to provide a liquid crystal display device which can eliminate the light reflection derived from signal lines.

It is still another object of the present invention to provide a liquid crystal display device which can prevent the leaking of light from a backlight when the liquid crystal display device is constituted as a partial reflection type (provided with a backlight).

SUMMARY OF THE INVENTION

The summary of typical examples of various aspects of the invention disclosed herein will be outlined below.

That is, a liquid crystal display device according to the present invention includes, for example, a plurality of gate signal lines which are formed on an insulation substrate, a plurality of drain signal lines which are formed on the insulation substrate such that the drain signal lines intersect the gate signal lines, thin film transistors which are connected to the gate signal lines, the drain signal lines and reflection electrodes which are connected to the thin film transistors, the thin film transistors and the reflection electrodes being formed on pixel regions which are surrounded by these respective signal lines, and sequential laminated bodies, each of which is made of at least a light shielding film and a semiconductor layer, each sequential laminated body being formed between the reflection electrode and the reflection electrode of another neighboring pixel region such that the sequential laminated body is superposed on the sides of these reflection electrodes.

In the liquid crystal display device having such a constitution, the light shielding film is formed between the reflection electrodes of respective pixel regions, and, hence, it is no longer necessary to provide a black matrix, which has a function similar to the function of the light shielding film, on the other insulation substrate.

This implies that it becomes possible to narrow the width of the light shielding films without taking the tolerance of superposition between one insulation substrate and the other insulation substrate into consideration, whereby the numerical aperture can be enhanced.

Further, the semiconductor layers are formed over the light shielding films, and, hence, the reflection of an external light on the light shielding films can be largely reduced.

DETAILED DESCRIPTION OF THE PREFERRED EMBODIMENTS

Various embodiments of a liquid crystal display device according to the present invention will be explained in detail in conjunction with the accompanying drawings.

Embodiment 1

Equivalent Circuit

Figure 2:
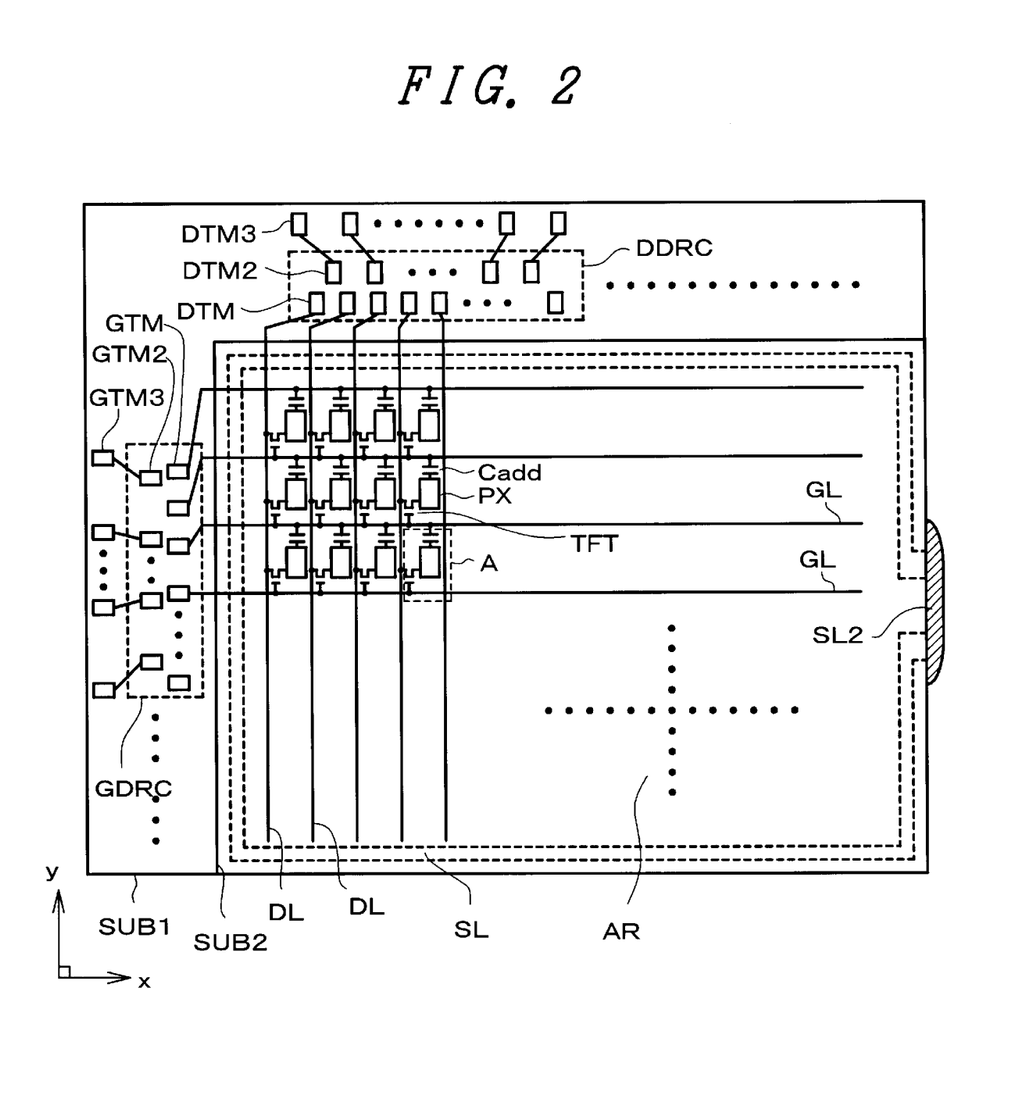
FIG. 2 is an equivalent circuit diagram showing one embodiment of the liquid crystal display device according to the present invention.

FIG. 2 is an equivalent circuit diagram showing one embodiment of a liquid crystal display device according to the present invention. Although the drawing is in the form of a schematic circuit diagram, the circuit is drawn in conformity with an actual geometric arrangement of the device.

In the drawing, a first transparent substrate SUB1 is arranged to face a second transparent substrate SUB2 that liquid crystal material is disposed between the transparent substrates SUB 1, SUB2.

On a liquid-crystal-side surface of the transparent substrate SUB1, gate signal lines GL are formed which extend in the x direction and are arranged in the y direction in parallel, and drain signal lines DL are formed which are insulated from the gate signal lines and extend in the y direction and are arranged in the x direction in parallel. Rectangular regions, which are surrounded by respective signal lines GL, DL, constitute pixel regions, and a display part AR is constituted by a mass of these respective pixel regions.

On each pixel region, a thin film transistor TFT, which is driven by the supply of scanning signals (voltage) from the one-side gate signal line GL, and a pixel electrode PX, to which video signals (voltage) are supplied from the one-side drain signal line DL by way of the thin film transistor TFT, are formed. Further, a capacitive element Cadd is formed between the pixel electrode PX and the other gate signal line GL, which is disposed close to one gate signal line GL. Due to this capacitive element Cadd, when the thin film transistor TFT is turned off, the video signals supplied to the pixel electrode PX are stored for a long time.

The pixel electrode PX in each pixel region is configured to generate an electric field between the pixel electrode PX and a counter electrode CT (not shown in the drawings) which is formed in common with respective pixel regions on a liquid crystal side surface of the transparent substrate SUB2 which is arranged to face the substrate SUB1 with liquid crystal material disposed therebetween. With such a construction, the light transmittivity of the liquid crystal material between the respective electrodes can be controlled.

One end of each gate signal line GL extends to one side (left side in the drawing) of the transparent substrate SUB 1. On an extended portion of the gate signal line GL, a terminal portion GTM is formed, which is connected to a bump of a semiconductor integrated circuit GDRC, which is constituted of a vertical scanning circuit mounted on the transparent substrate SUB1. Further, one end of each drain signal line DL extends to one side (upper side in the drawing) of the transparent substrate SUB1. On an extended portion of the drain signal line DL, a terminal portion DTM is formed, which is connected to a bump of a semiconductor integrated circuit DDRC, which is constituted of a video signal driving circuit mounted on the transparent substrate SUB1.

The respective semiconductor integrated circuits GDRC, DDRC per se are completely mounted on the transparent substrate SUB1, thus forming a so-called COG (Chip-On-Glass) system. Respective bumps at the input sides of the semiconductor integrated circuits GDRC, DDRC are respectively connected to the terminal portions GTM2, DTM2 formed on the transparent substrate SUB 1. These respective terminal portions GTM2, DTM2 are connected to terminal portions GTM3, DTM3, which are respectively arranged at portions closest to end faces in the periphery of the transparent substrate SUB1 through respective wiring layers.

The transparent substrate SUB2 is arranged to face the transparent substrate SUB1 so as to avoid the regions on the substrate SUB1 where the semiconductor integrated circuits GDRC, DDRC are mounted, as permitted by the fact that the transparent substrate SUB2 has a smaller area than the transparent substrate SUB1. The transparent substrate SUB2 is fixed to the transparent substrate SUB1 by a sealing member SL which is formed around the periphery of the transparent substrate SUB2. The seal member SL also has a function of sealing the liquid crystal between the transparent substrates SUB1, SUB2.

In the above-mentioned embodiment, a liquid crystal display device which uses the COG system has been described. However, the present invention is also applicable to a liquid crystal display device which adopts a TCP system. In the TCP system, semiconductor integrated circuits are formed in a tape carrier system; and, output terminals of the semiconductor integrated circuits are connected to terminal portions formed on the transparent substrate SUB1, while input terminals of the semiconductor integrated circuits are connected to terminal portions on a printed circuit board arranged close to the transparent substrate SUB1.

Constitution of a Pixel

Figure 1:
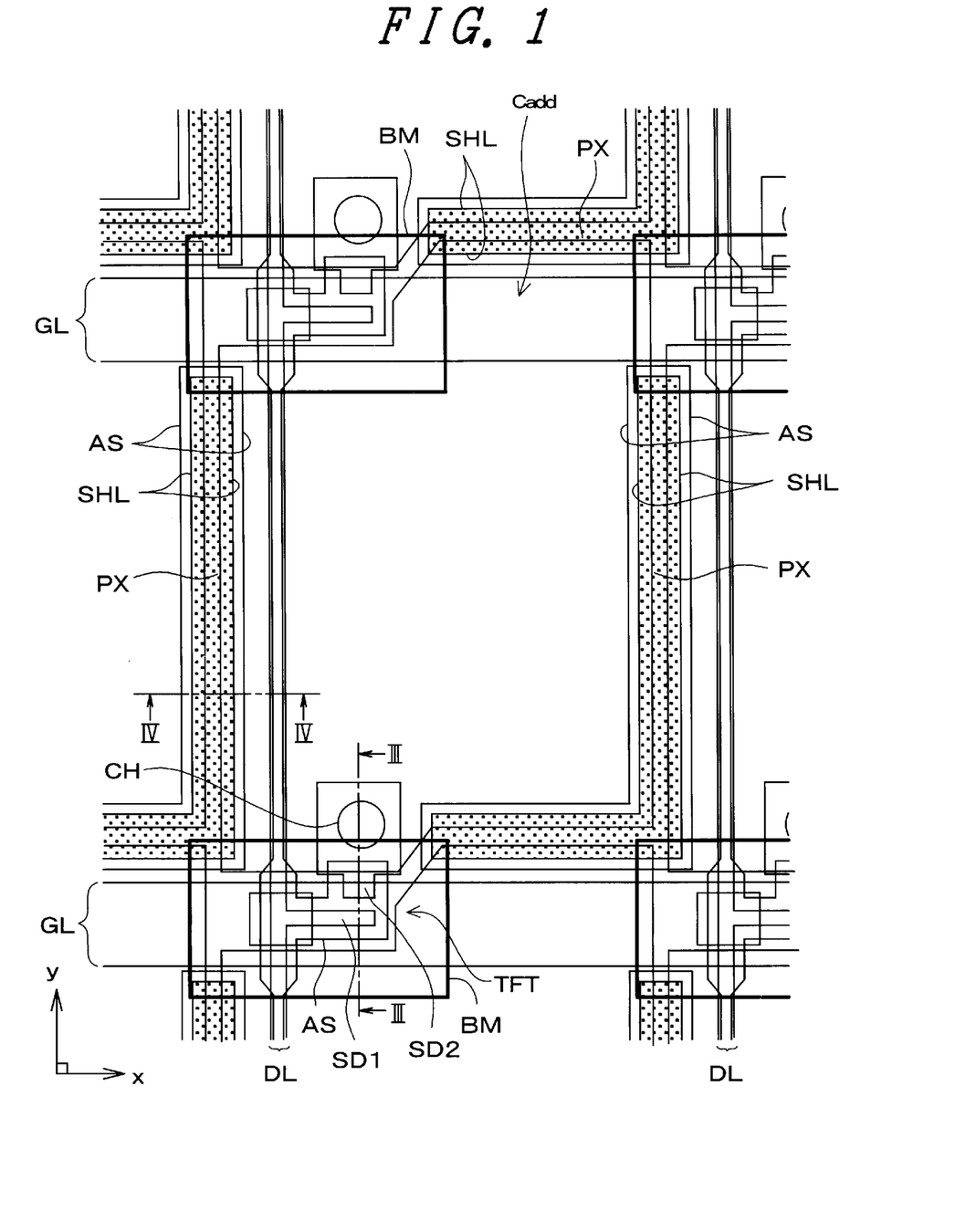
FIG. 1 is a plan view showing one embodiment of a pixel of a liquid crystal display device according to the present invention.
Figure 3:
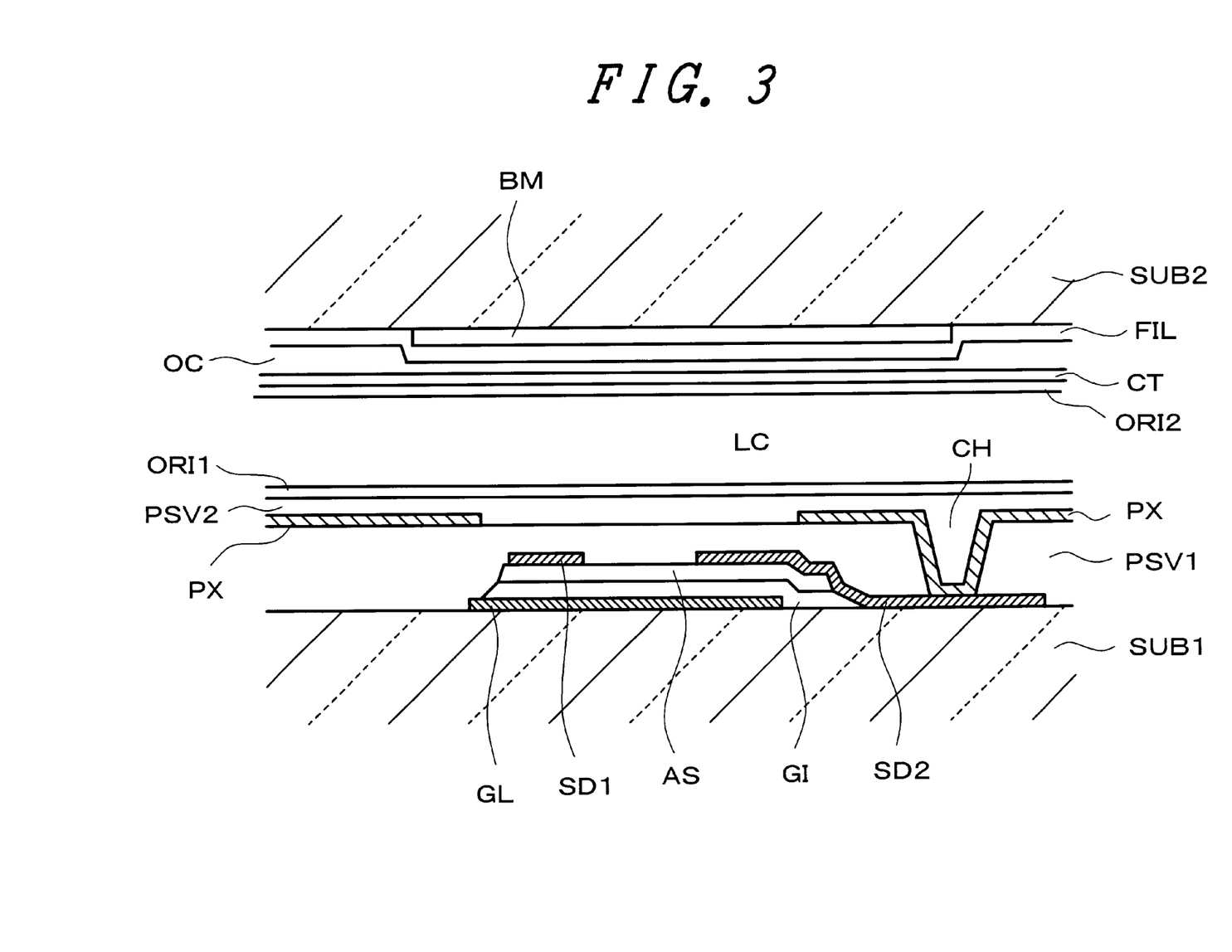
FIG. 3 is a cross-sectional view taken along a line III—III of FIG. 1.
Figure 4:
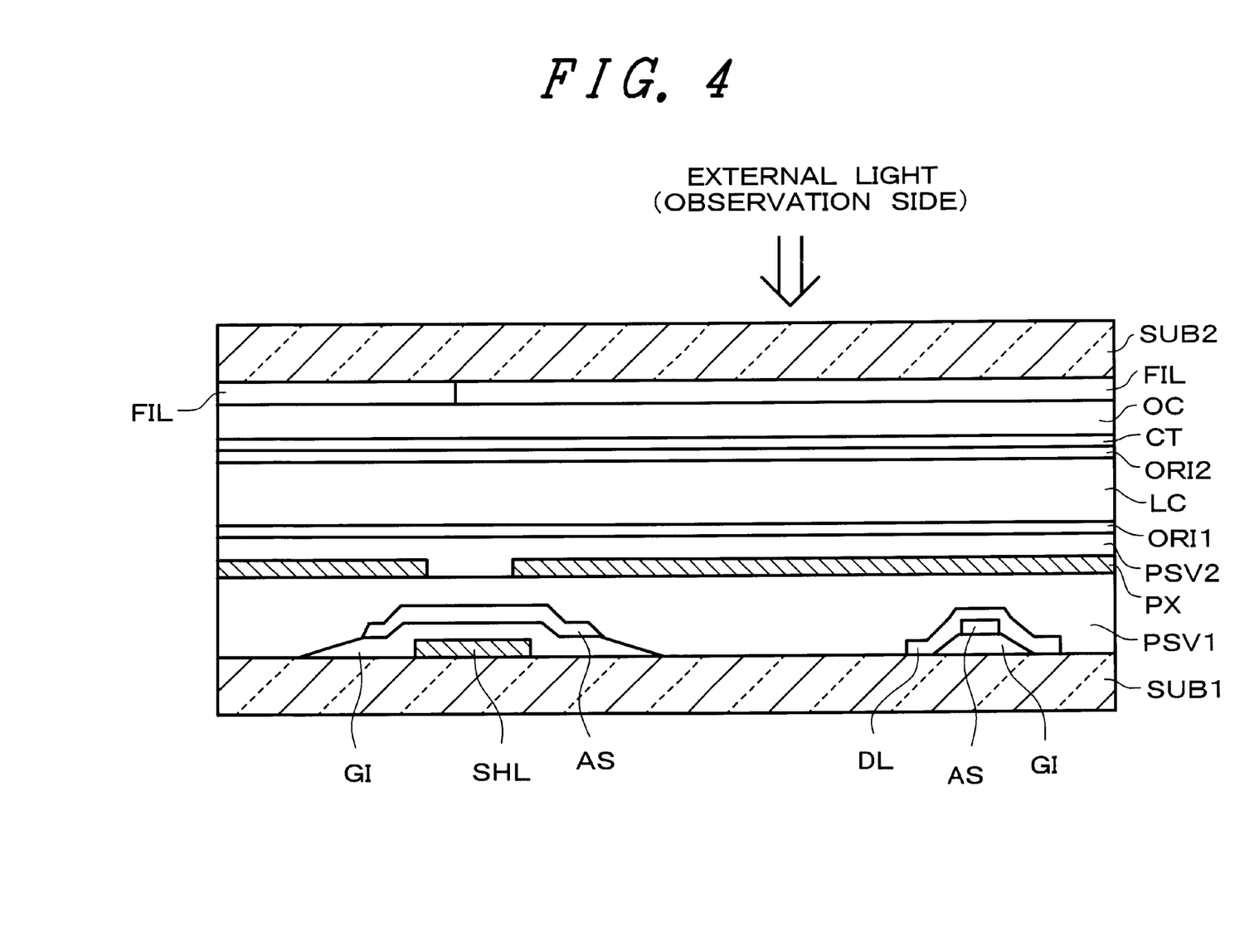
FIG. 4 is a cross-sectional view taken along a line IV—IV of FIG. 1.

FIG. 1 is a plan view showing the constitution of one pixel region on the transparent substrate SUB1, which pixel region corresponds to a portion A which is indicated by a dotted line in FIG. 2. Further, FIG. 3 is a cross-sectional view taken along a line III—III of FIG. 1, and FIG. 4 is a cross-sectional view taken along a line IV—IV of FIG. 1.

In FIG. 1, first of all, the gate signal lines GL which extend in the x direction and are arranged in the y direction in parallel in the drawing are formed on the liquid-crystal-side surface of the transparent substrate SUB 1. The gate signal lines GL are formed of aluminum, for example, and have surfaces thereof subjected to anodic oxidation.

In this embodiment, the light shielding films SHL made of Al, which are simultaneously formed with the formation of the gate signal lines GL, are formed within the pixel region. The light shielding films SHL are formed to have an inverse "L" shaped pattern with respect to the pixel region, wherein each light shielding film SHL is arranged close to the lower-side gate signal line GL and the right-side drain signal lines DL, among the drain signal lines DL, which will be explained later. The light shielding films SHL have surfaces thereof also subjected to anodic oxidation as in the case of the gate signal lines GL.

Then, a sequential laminated body, which is constituted of an insulation film GI that is formed of a silicon nitride film (SiN) and a semiconductor layer AS formed of amorphous Si (a—Si), is formed on a region where the thin film transistor TFT is formed, regions where the drain signal lines DL, which will be explained later, are formed and upper surfaces of the light shielding films SHL.

In the region where the thin film transistor TFT is formed, a portion of the gate signal line GL is used as a gate electrode, the insulation film GI is used as a gate insulation film, and the semiconductor layer AS is formed as a channel forming portion. Further, a drain electrode SD1 and a source electrode SD2 are formed on an upper surface of the semiconductor layer AS. In this manner, the thin film transistor TFT, which is formed of a MIS type transistor having an inverse stagger structure, can be formed. Here, the drain electrode SD1 and the source electrode SD2 are formed simultaneously with the formation of the drain signal lines DL, which will be explained later.

The sequential laminated body formed of the insulation film GI and the semiconductor layer AS, which is arranged on the region where the drain signal lines DL are formed has a function~of an interlayer insulation film relative to the gate signal lines GL. Further, the sequential laminated body is configured such that no sharp steps are formed along the running direction of the drain signal lines DL. The sequential laminated body formed of the insulation film GI and the semiconductor layer AS, which is arranged on the light shielding film SHL, has at least a function of attenuating the influence of reflected external light by the light shielding film SHL with the use of the semiconductor layer AS. This function will be explained in more detail later.

The drain signal lines DL are formed to extend in the y direction and are arranged in parallel in the x direction. Here, the drain signal lines DL are formed on the above-mentioned sequential laminated body, which is formed of the insulation film GI and the semiconductor layer AS. Further, the drain signal line DL has a portion thereof which extends to and is formed on an upper surface of the semiconductor layer AS in the region where the thin film transistor TFT is formed. This extended portion of the thin drain signal line DL is formed as the drain electrode 5D1 of the thin film transistor TFT.

Further, at the same time, the source electrode 5D2 is formed so as to be spaced from the above-mentioned drain electrode SD1 by a distance corresponding to the channel length of the thin film transistor TFT. The source electrode SD2 is connected to the pixel electrode PX, which will be explained later. To ensure such a connection portion with the pixel electrode PX, the electrode SD2 forms a pattern in which there is an extension portion which extends slightly toward the center of the pixel region. Here, semiconductor layers doped with impurities are respectively formed at interfaces between the drain electrode SD1, the source electrode SD2 and the semiconductor layer AS. These semiconductor layers function as contact layers.

After forming the semiconductor layer AS, a semiconductor layer doped with impurities and having a thin film thickness is formed on the surface of the semiconductor layer AS. Then, after forming the drain electrode SD1 and the source electrode SD2, using the respective electrodes as masks, an exposed portion of the semiconductor layer doped with impurities is etched, thus providing the above-mentioned constitution. Then, over the surface of the transparent substrate SUB1, on which the drain signal lines DL (drain electrodes SD1, source electrodes SD2) are formed, a protective film PSV1 made of SiN, for example, is formed such that the protective film PSV1 also covers the drain signal lines DL and the like.

The protective film PSV1 is provided for avoiding direct contact between the thin film transistor TFT and the liquid crystal material. A contact hole CH which exposes a portion of the extended portion of the source electrode SD2 of the thin film transistor TFT is formed in the protective film PSV1.

Further, on an upper surface of the protective film PSV1, the pixel electrode PX, which is constituted of a sequential laminated body formed of chromium (Cr) and aluminum (Al), for example, is formed such that the pixel electrode PX covers the pixel region. The pixel electrode PX functions as a reflection electrode. That is, when the external light from the transparent substrate SUB2 side which will be explained later, passes through the liquid crystal LC whose light transmittivity is controlled, the external light is reflected on the pixel electrode PX and again is irradiated to the transparent substrate SUB2 side (viewer side).

The pixel electrode PX is formed by avoiding the region where the thin film transistor TFT is formed. Further, the pixel electrode PX is formed so as to extend over portions of respective pixel regions arranged at the left side and the upper side of the drawing, for example. In other words, the drain signal line DL, which is formed between the pixel region and the left-side pixel region, and the gate signal line DL, which is formed between the pixel region and the upper-side pixel region, are covered with the above-mentioned pixel electrode PX. This implies that the lower-side gate signal line GL and the right-side drain signal line DL of the pixel region are respectively covered with the respective pixel electrodes PX of the lower-side pixel region and the right-side pixel region. Due to such a constitution, the gate signal line GL and the drain signal line DL are covered with an opaque metal layer which constitutes the pixel electrode PX so that the reflection of the external light by respective signal lines can be obviated.

The pixel electrode PX in the pixel region has a lower side and a right side thereof positioned within the pixel region, wherein both sides are positioned on the light shielding films SHL. Further, the pixel electrode PX is disposed close to the pixel electrode PX of other neighboring pixel regions with a gap therebetween on the light shielding film SHL. Here, the pixel electrode PX is also configured to cover the contact hole CH formed in the protective film PSV1 so that the pixel electrode PX is connected to the source electrode SD2 of the thin film transistor TFT.

Further, on the surface of the transparent substrate SUB2 on which the pixel electrode PX is formed, a protective film PSV2, which is formed of a silicon nitride film (SiN), for example, is formed such that the protective film (SiN) also covers the pixel electrode PX. The protective film PSV2 is provided for preventing direct contact between the pixel electrode PX and the liquid crystal material, and it can prevent the deterioration of characteristics of the liquid crystal material due to the presence of the metal layer.

On an upper surface of the protective film PSV2, an orientation film ORI1 is formed. The orientation film ORI1 is made of a resin, for example, and a rubbing treatment in a fixed direction is applied to a surface of the orientation film ORI1. The orientation film ORI1 is brought into contact with the liquid crystal LC so that the initial orientation direction of the liquid crystal LC is determined by the orientation film ORI1.

On the other hand, on a liquid-crystal side surface of the transparent substrate SUB2, black matrixes BM are formed at peripheries which include the regions where the thin film transistors TFT are formed (see FIG. 1). The black matrixes BM have only a function of avoiding the irradiation of external light onto the thin film transistor TFT, and, hence, the black matrixes BM are formed in an island-like pattern. Originally, the black matrixes BM were typically formed also on the gate signal lines GL and the drain signal lines DL to enhance the contrast of the display. In this embodiment, however, since the portions of the pixel electrodes PX also perform this function, the black matrixes BM-adopt the above-mentioned island-like pattern.

Color filters FIL are formed on the transparent substrate SUB2 such that the color filters FIL also cover the black matrixes BM. The color filters FIL are arranged such that, for example, the common filter of the same color is used on respective pixel regions which are arranged in the y direction in parallel, and the filters of red (R), green (G) and blue (B), for example, are arranged for every pixel region in the x direction so as to repeat this order.

Figure 5:
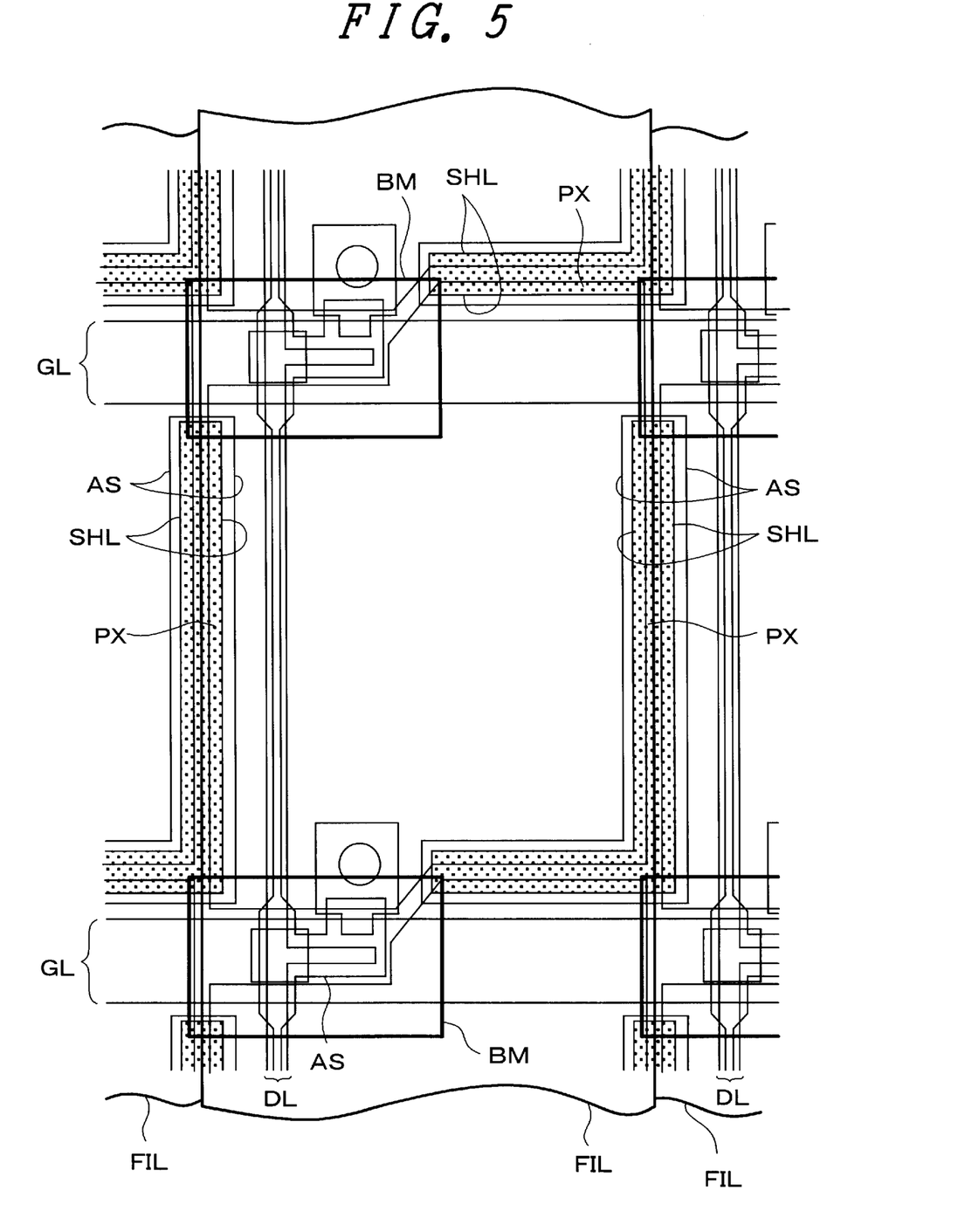
FIG. 5 is a plan view showing the details of an arrangement of color filters of the liquid crystal display device according to the present invention.

In this case, each color filter FIL is brought into contact with other neighboring color filters FIL without being superposed on each other, and the contact portions are arranged so as to be aligned with approximately the center axes of the light shielding films SHL which are formed in parallel to the drain signal lines DL, among the light shielding films SHL formed on the transparent substrate SUB1 side. FIG. 5 is a plan view (corresponding to FIG. 1) which shows the positional relationship between the transparent substrate SUB1 and the transparent substrate SUB2 on which the color filters FIL are formed. Boundary portions between the color filter FIL and the other neighboring color filters FIL are positioned on the light shielding films SHL.

On the surface of the transparent substrate SUB2 on which the black matrixes BM and the color filters FIL are formed in the above-mentioned manner, a flattening film OC made of resin is formed by coating, such that the flattening film OC also covers the color filters FIL. The flattening film OC is formed such that stepped portions derived from the black matrixes BM are not present apparently on a surface thereof.

A counter electrode CT, which is made of ITO, for example, and is commonly used for respective pixel regions, is formed on a surface of the flattening film OC. The counter electrode CT generates an electric field which corresponds to video signals (voltage) between the counter electrode CT and the pixel electrodes PX in respective pixel regions and controls the light transmittivity of the liquid crystal LC between these respective electrodes.

Further, on the surface of the transparent substrate SUB2 on which the counter electrode CT is formed, an orientation film ORI2 is formed, such that the orientation film ORI2 also covers the counter electrode CT. The orientation film ORI2 is made of resin, for example, and a rubbing treatment in a fixed direction is applied to a surface of the orientation film ORI2. The orientation film ORI2 is brought into contact with the liquid crystal LC so that the initial orientation direction of the liquid crystal LC is determined by the orientation film ORI2.

In the liquid crystal display device having such a constitution, the pixel electrode PX of each pixel region forms the light shielding film SHL at a region defined between the pixel electrode PX and a neighboring pixel electrode PX, so that it is unnecessary to provide a black matrix which has a function (enhancement of contrast) similar to the function of the light shielding film SHL to the other transparent substrate SUB2 side. This implies that the width of the light shielding film SHL can be narrowed without taking the tolerance of superposition between one transparent substrate SUB1 and the other transparent substrate SUB2 into consideration, so that the liquid crystal display device having the improved numerical aperture can be realized. Further, since the semiconductor layer AS is laminated over the light shielding film SHL, the reflection of the external light on the light shielding film SHL can be largely reduced by the semiconductor layer AS.

The semiconductor layer AS made of a—Si exhibits dark red brown color, and the light which is reflected on the light shielding film SHL adopts a red-based color after passing through the semiconductor layer AS.

Further, the pixel electrode PX, which is formed of opaque metal, is formed such that the pixel electrode PX extends over the neighboring pixel regions by going beyond the gate signal line GL formed at the upper side of the pixel region, as seen in the drawing, and the drain signal line DL formed at the left side of the pixel region, as seen in the drawing, and respective signal lines are covered with the pixel electrode PX. Accordingly, the reflection of external light on the gate signal lines GL and the drain signal lines DL can be avoided.

Between the gate signal line GL and the pixel electrode PX, which covers this gate signal line GL, the capacitive element Cadd, which uses the protective film PSV1 as a dielectric film, is formed. In such a constitution, since the pixel electrode PX is formed such that the pixel electrode PX covers the whole gate signal line GL in the width direction, the area of superposition can be increased so that an advantageous effect can be obtained in that the capacitance of the capacitive element Cadd can be increased.

Manufacturing Method

Figure 6A:
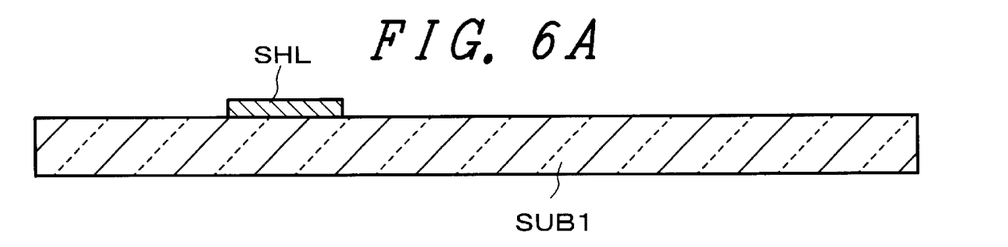
FIG. 6A to FIG. 6D are sectional views showing sequential steps in the method of manufacture of a liquid crystal display device according to the present invention.

One embodiment of the method of manufacture of the above-mentioned liquid crystal display device will be explained in conjunction with FIG. 6A to FIG. 6D. FIG. 6A to FIG. 6D are views showing the cross sections taken along a line IV—IV of FIG. 1.
Step 1. (FIG. 6A)

On the transparent substrate SUB 1, Al is stacked by a sputtering method until a resist film made of Al having a thickness of 300 nm is formed. After completion of a photolithography step, the resist film is peeled off by etching using a mixed solution of phosphoric acid, hydrochloric acid and nitric acid, thus forming the gate signal lines GL. The light shielding films SHL are formed simultaneously. That is, the light shielding films SHL are simultaneously formed at the time of forming the gate signal lines GL, so that it is unnecessary to increase the number of steps in forming the light shielding films SHL.

The surface of patterned Al is anodized in a tartaric acid to form an anodized film having a thickness of 180 nm. The formation of an anodized film is necessary for the following reason. That is, Al is liable to generate hillocks, so that when the drain signal lines DL are formed on interlayer insulation films sandwiched between the drain signal lines DL and Al in a subsequent step, a short-circuiting arises due to penetration of the interlayer insulation film. The anodized film can prevent the occurrence of such a phenomenon.
Step 2. (FIG. 6B)

Figure 6B:
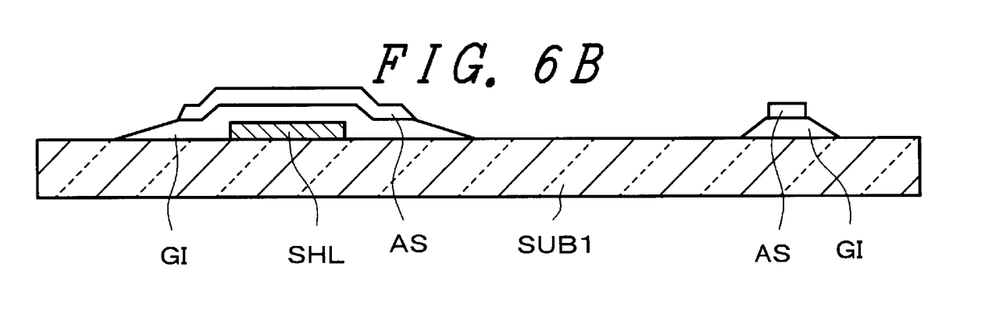

On the transparent substrate SUB1, an insulation film made of SiN is stacked using a CVD method until the thickness thereof becomes 240 nm, thus forming the insulation film GI. Then, amorphous Si is stacked until the amorphous Si has a thickness of 200 nm. Thereafter, n+ amorphous Si doped with phosphorus (P) is stacked until the 11+ amorphous Si has a thickness of 35 nm, thus forming the semiconductor layer AS.

After completion of a photolithography step, the laminated body formed of the insulation film GI, as mentioned above, and the semiconductor layer AS are subjected to dry etching at one time using hexafluoric sulfur gas. In this case, the etching speed of the amorphous Si, which forms the semiconductor layer AS constituting the upper layer, is faster than the etching speed of the silicon nitride which forms the insulation film GI constituting the lower layer. Accordingly, the semiconductor layer AS and the insulation film GI are formed substantially in the same patterns, wherein the end portions of the insulation film GI have a normal taper of approximately 4° and the end portions of the semiconductor layer AS have a normal taper of approximately 70°.

Due to such a constitution, the laminated body made of the insulation film GI and the semiconductor layer AS can have side wall surfaces thereof that are smooth and can avoid the presence of steep stepped portions on the side wall surface, and, hence, disconnection with the wiring layers at stepped portions, which may occur due to the presence of the steep stepped portions, can be avoided.

Figure 6C:
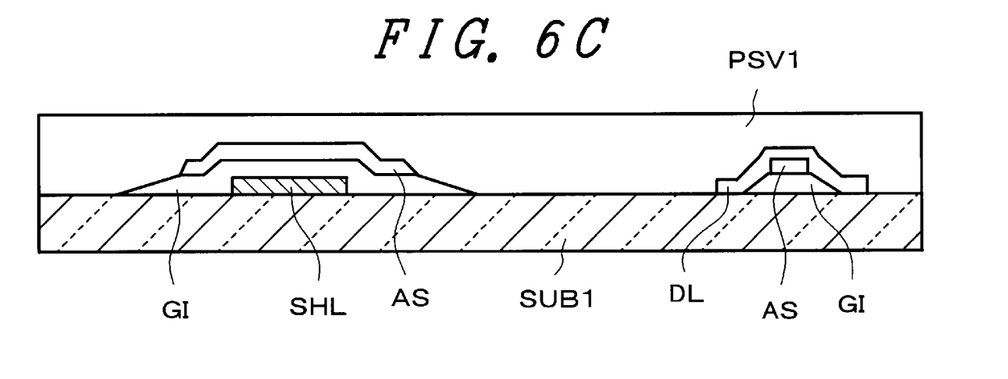

Step 3 (FIG. 6C)

On the transparent substrate SUB1, Cr having a thickness of 30 nm is stacked using a sputtering method, and, thereafter, Al having a thickness of 200 nm is stacked.

After completion of a photolithography step, Al is etched using a mixed solution of phosphoric acid, hydrochloric acid and nitric acid, and then Cr is etched using a cerium nitrate second ammonium solution, thus forming the drain signal lines DL, the drain electrodes SD1 and the source electrodes SD2. Subsequently, dry etching is performed using hexafluoric sulfur gas and the resist film is peeled off after removing n+ amorphous Si, which constitutes an upper layer of the semiconductor layer AS.

On the transparent substrate SUB1, silicon nitride having a film thickness of 600 nm is stacked using a C\TD method. After completion of a photolithography step, the patterning is performed by dry etching using hexafluoric sulfur gas. Thereafter, the resist film is peeled off to form the first protective films PSV1 and their contact holes CH.

Figure 6D:
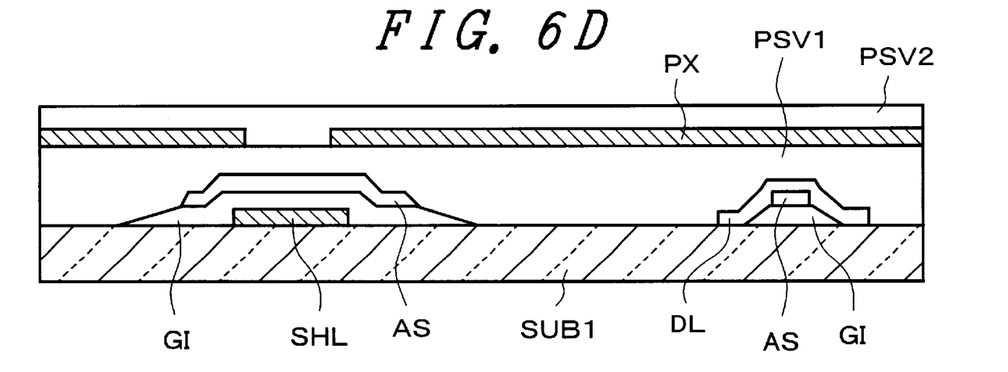

Step 4 (FIG. 6D)

On the transparent substrate SUB1, Cr having a thickness of 30 nm is stacked using a sputtering method, and, thereafter, Al having a thickness of 200 nm is stacked. After completion of a photolithography step, it is etched using a mixed solution of phosphoric acid, hydrochloric acid and. nitric acid, and then Cr is etched using cerium nitrate second ammonium solution, thus forming the pixel electrodes PX.

On the transparent substrate SUB 1, silicon nitride having a film thickness of 300 nm is stacked using a C\TD method. After completion of a photolithography step, the patterning is performed by dry etching using hexafluoric sulfur gas. Thereafter, the resist film is peeled off to form the second protective film PSV2.

Embodiment 2

Figure 7:
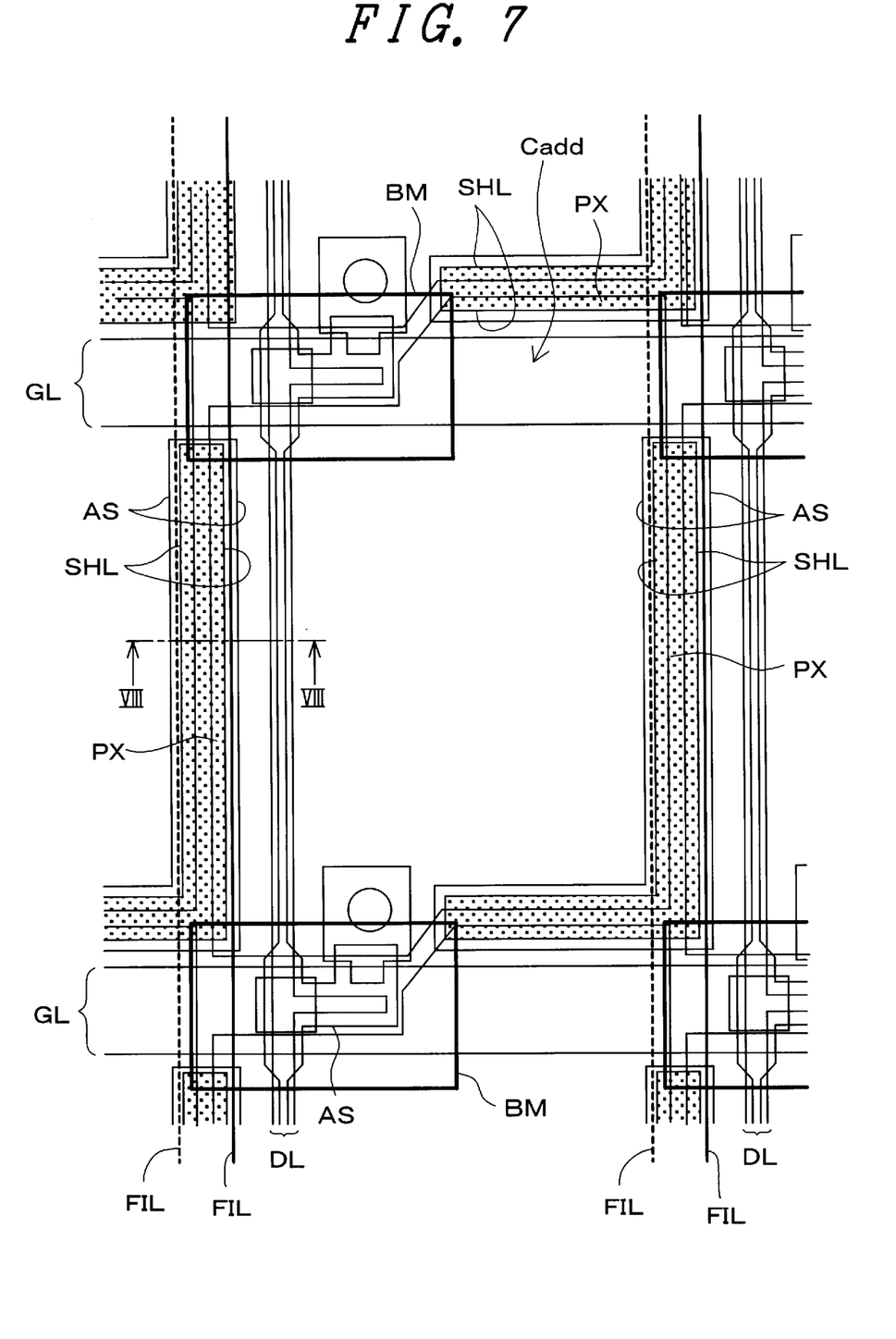
FIG. 7 is a plan view showing another embodiment of the pixel of the liquid crystal display device according to the present invention.
Figure 8:
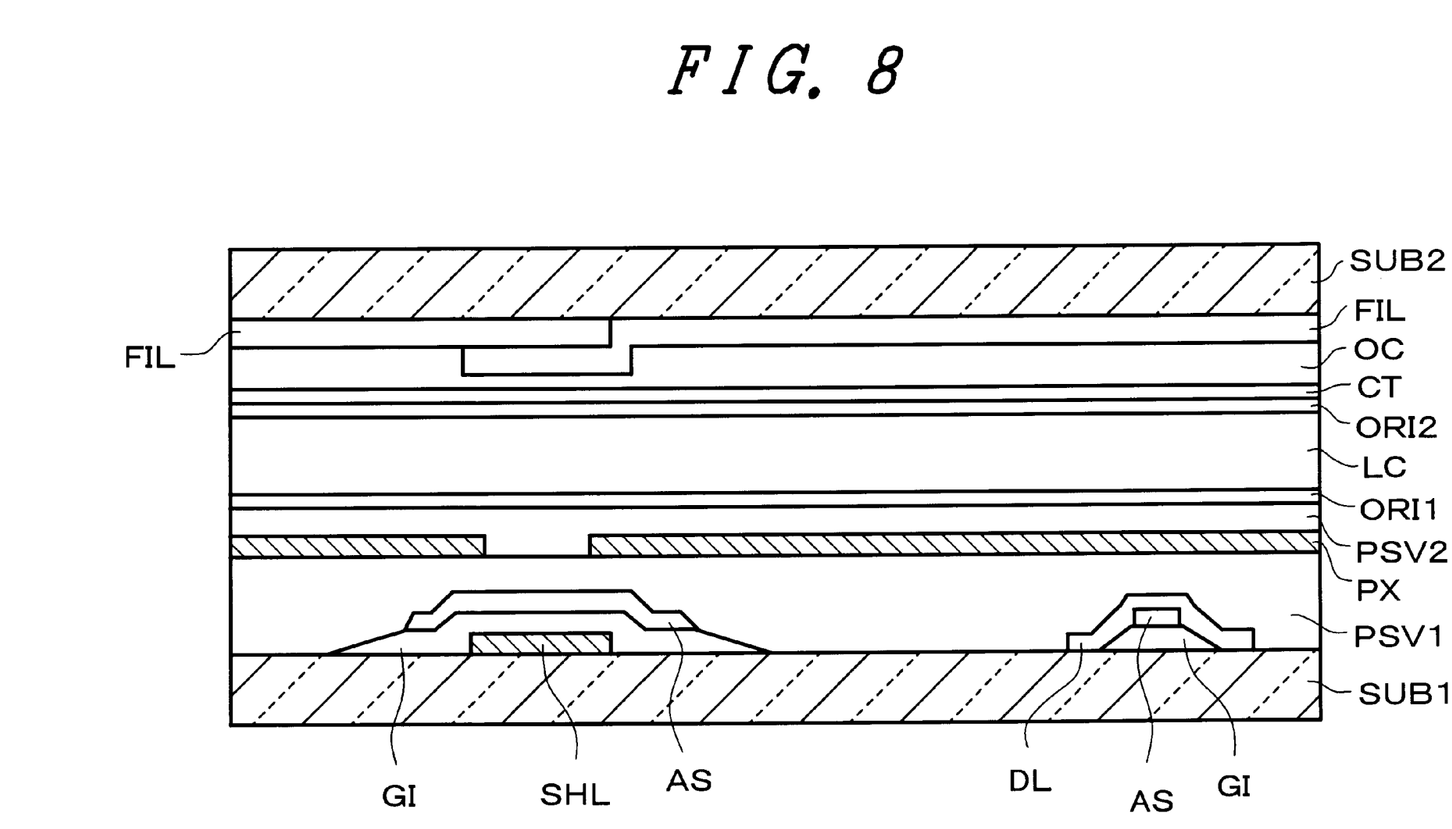
FIG. 8 is a cross-sectional view taken along a line VIII—VIII of FIG. 7.

FIG. 7 is a plan view showing another embodiment of the liquid crystal display device according to the present invention. FIG. 7 corresponds to FIG. 1. Further, a cross-sectional view taken along a line VIII—VIII of FIG. 7 is shown in FIG. 8.

The constitution of this embodiment, which is different from the constitution shown in FIG. 1, lies in the color filters FIL formed at the transparent substrate SUB2 side.

A boundary portion, which is defined between each color filter FIL and the color filter FIL disposed close to each color filter FIL, is positioned above the light shielding film SHL. Further, above the light shielding film SHL, one color filter FIL is formed on the other color filter FIL in a superposed manner. In this case, at least one of the superposed color filters FIL is formed of the green or blue color filter FIL, that is, preventing only the red color filter FIL from being formed in the superposed state.

As mentioned above, the external light which is reflected on the light shielding film SHL, that is covered with the semiconductor layer AS, adopts a red color after passing through the semiconductor layer AS and is irradiated on the superposed portion of the color filters FIL mentioned previously. In this case, since the color of the color filter FIL which constitutes the upper layer of the superposed portion is either green or blue, this light is absorbed, and, hence, the reflected light can be reduced.

When the color filter FIL which constitutes the upper layer (color filter on the liquid crystal LC side) is red, although the reflected external light passes through the red color filter, the green or blue color filter exists in the lower layer, and, hence, the light is absorbed by this green or blue color filter. Accordingly, the colors of color filters FIL may be superposed in any desired order. Based on such an understanding, it is unnecessary for the color filter FIL which is disposed above the light shielding film SHL to form a superposed portion with another neighboring color filter FIL, and so advantageous effects similar to the advantageous effects of the embodiment 1 can be obtained by merely arranging either the green or blue color filter FIL.

Embodiment 3

Figure 9:
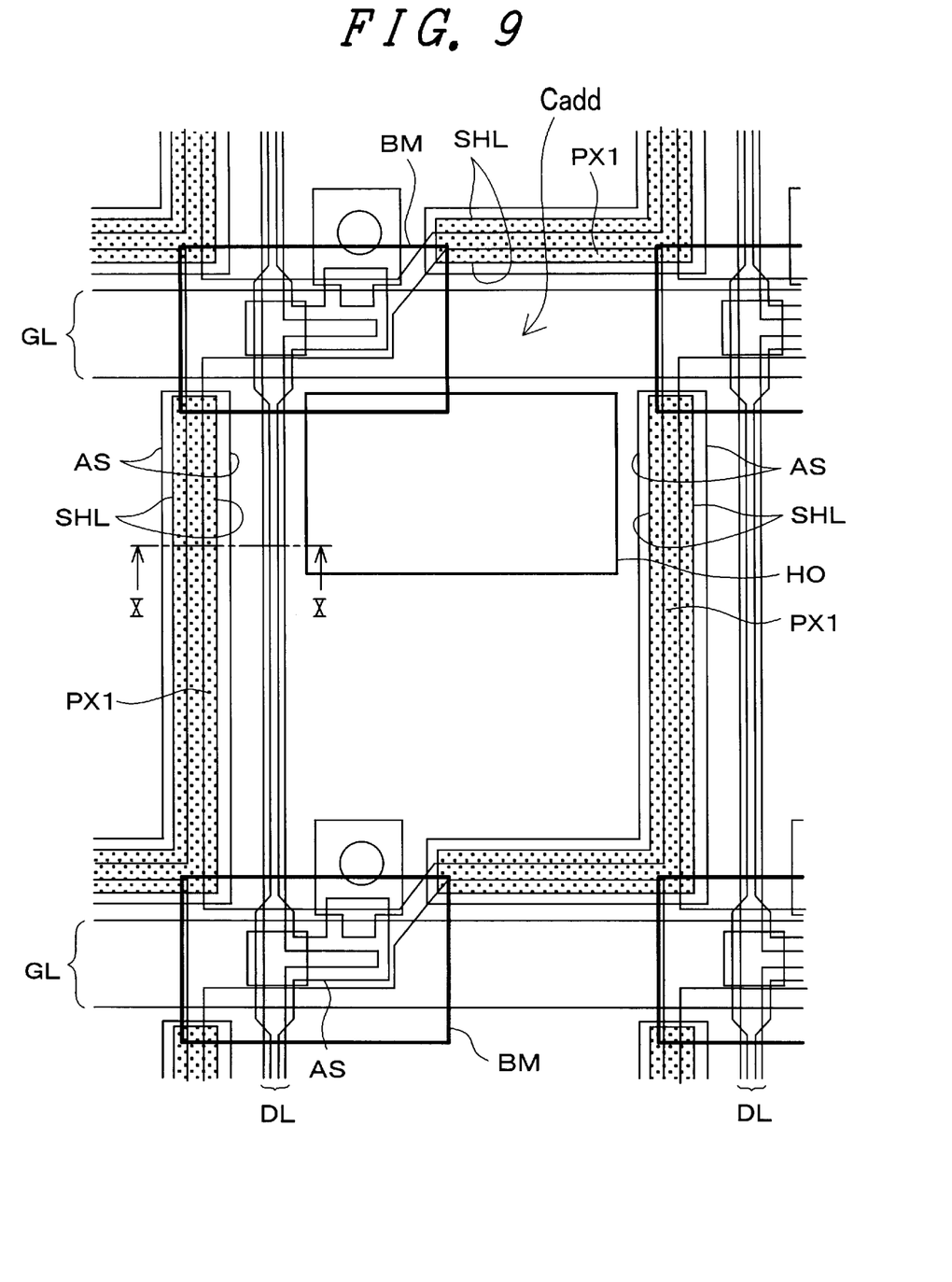
FIG. 9 is a plan view showing still another embodiment of a pixel of the liquid crystal display device according to the present invention.
Figure 10:
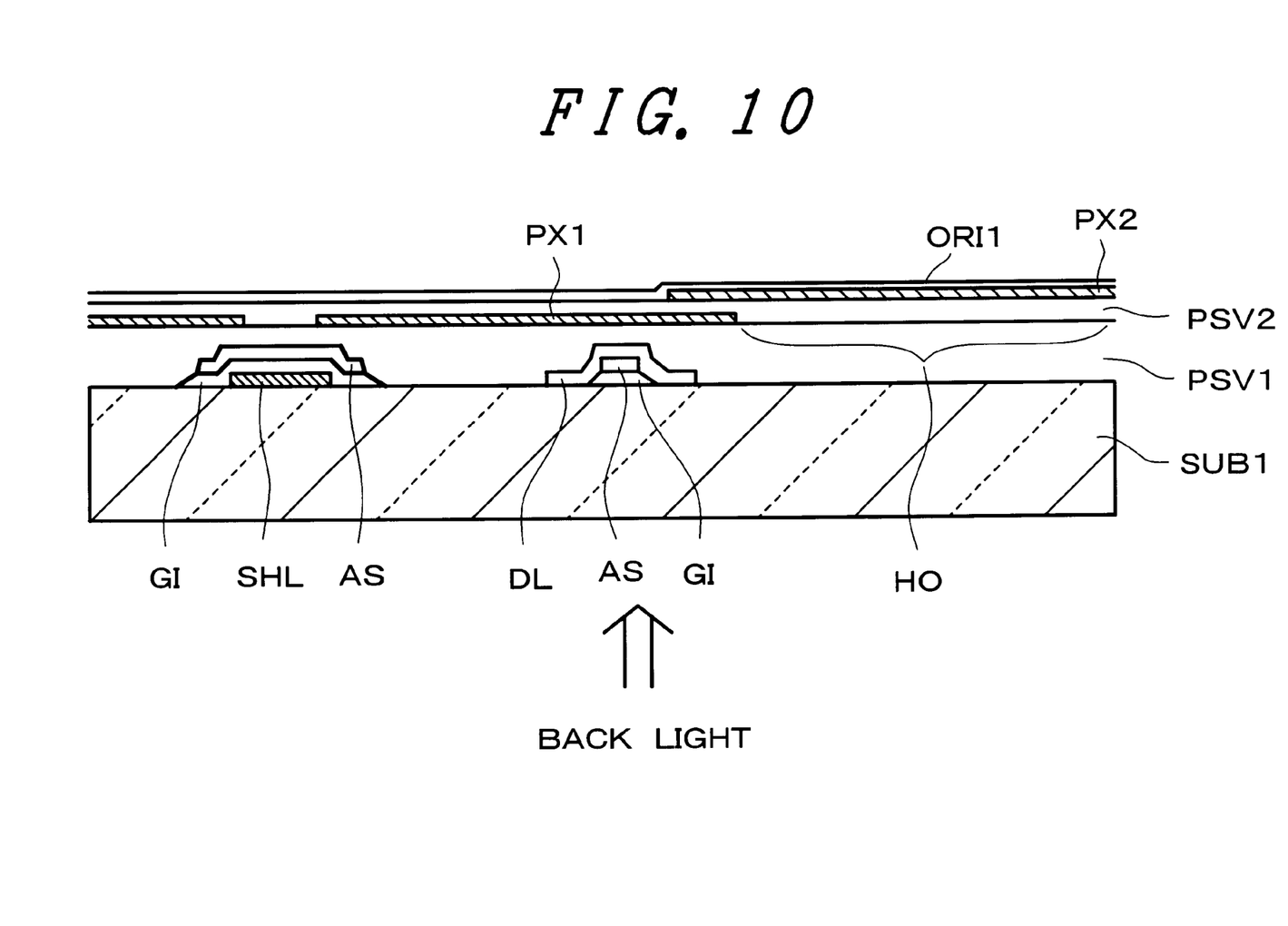
FIG. 10 is a cross-sectional view taken along a line X—X of FIG. 9.

FIG. 9 is a plan view showing still another embodiment of the liquid crystal display device according to the present invention. FIG. 9 corresponds to FIG. 7. Further, FIG. 10 is a cross-sectional view (only of the transparent substrate SUB1 side) taken along a line X—X in FIG. 9.

The liquid crystal display device according to this embodiment adopts a partially transmitting and partially reflective structure. The liquid crystal display device is provided with a backlight at a back surface thereof, and the backlight is turned on or off depending on the circumstances at the time of display.

The constitution which makes this embodiment different from the previous embodiment shown in FIG. 7 lies in that, first of all, a pixel electrode PX1 formed of a metal layer (corresponding to the pixel electrode PX in FIG. 7) is provided with an opening portion HO at a portion which occupies approximately a half thereof in a pixel region, for example. That is, the opening portion HO formed in the pixel electrode PX1 constitutes a part which allows the light from the backlight~pass therethrough. Further, as shown in FIG. 10, a pixel electrode PX2, which is formed of an ITO (Indium-Tin-Oxide) film, for example, is formed over most of the region of an upper surface of a protective film PSV2, except for a periphery of the pixel region.

Although not shown in the drawing, the pixel electrode PX2 is connected to the pixel electrode PX through a contact hole formed in the protective film PSV2, so that video signals, which are supplied to the pixel electrode PX1, are also supplied to the pixel electrodes PX2. That is, the generation of an electric field in the opening portion HO of the pixel electrode PX1 is performed by the pixel electrode PX2, and the light from the backlight is irradiated to the viewer side through the liquid crystal material, whose light transmittivity is changed in response to the intensity of the electric field.

In the liquid crystal display device having such a constitution, since the light shielding film SHL is present between each pixel electrode PX1 and another neighboring pixel electrode PX1 which is disposed close to this pixel electrode PX1, an advantageous effect is obtained in that the leaking of light from the backlight can be prevented.

In this embodiment, the pixel electrode PX2, which is formed of an ITO film, is formed over the upper surface of the protective film PSV2. However, it is needless to say that the pixel electrode PX2 can be formed on a layer on which gate signal lines GL and a light shielding film SHL are formed. In this case, at the time of forming a source electrode SD2 of thin film transistor TFT, by extending the source electrode SD2 to a region where the pixel electrode PX2 mentioned previously is formed, the source electrode SD2 and the pixel electrode PX2 can be connected to each other, whereby an advantageous effect is obtained in that a step to form a contact hole or the like becomes no longer necessary.

Embodiment 4

Figure 11:
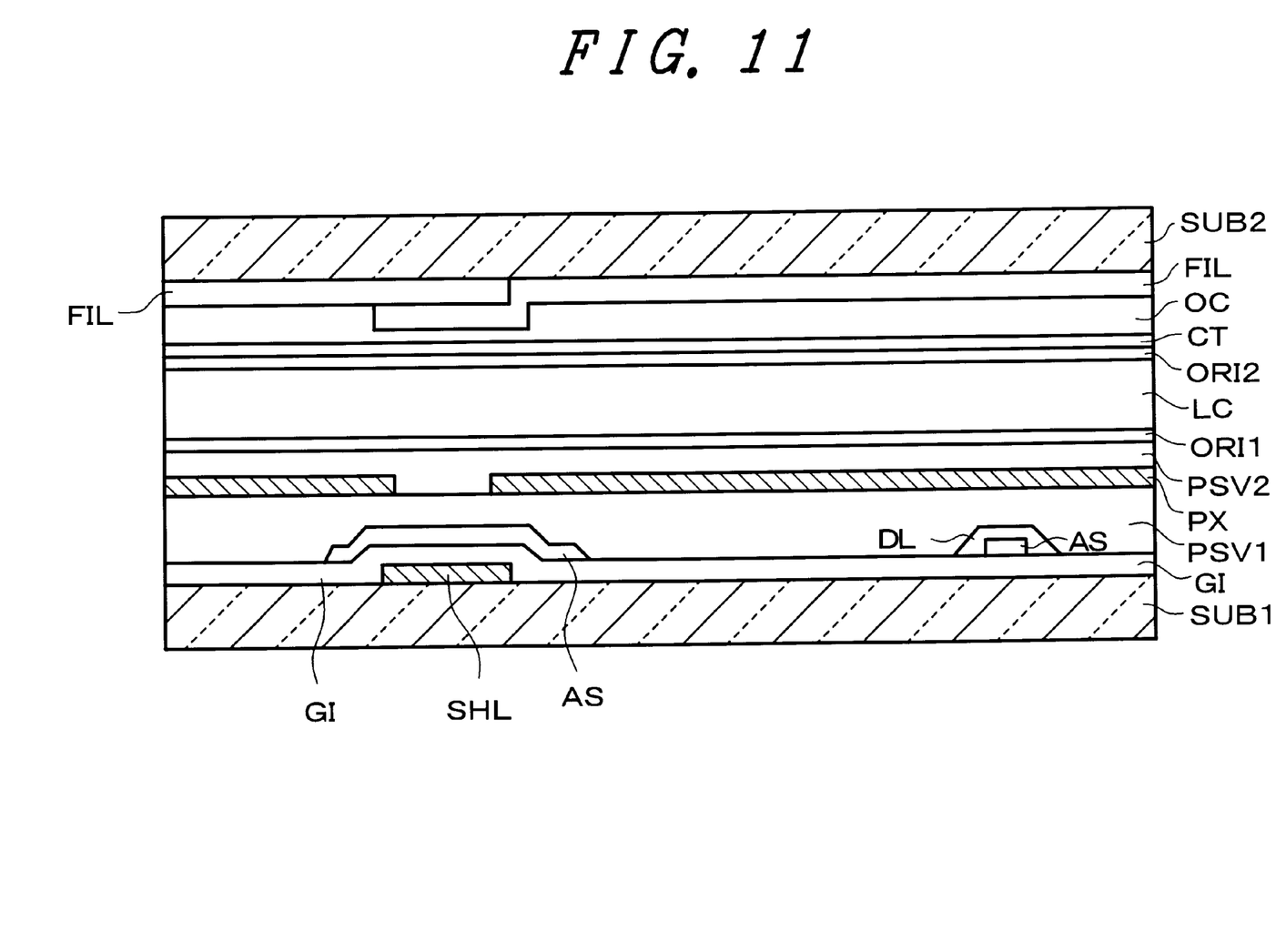
FIG. 11 is a cross-sectional view showing a further embodiment of the liquid crystal display device according to the present invention.

FIG. 11 is a cross-sectional view showing a further embodiment of the liquid crystal display device according to the present invention, and it corresponds to FIG. 4, FIG. 8 and FIG. 10.

The constitution which makes this embodiment different from the previous embodiment shown in FIG. 7 lies in the isolation film GI, which functions as gate insulation films of thin film transistors TFT. That is, in the above-mentioned respective embodiments, the insulation films GI are formed together with semiconductor layer AS on regions where thin film transistors TFT are formed, regions where drain signal lines DL are formed and regions where light shielding films SHL are formed. However, in this embodiment, the insulation film GI is substantially formed over the whole area of an upper surface of a transparent substrate SUB1.

Such a constitution does not deteriorate the advantageous effects of the present invention, and, hence, this embodiment can also obtain advantageous effects similar to those of the above-mentioned embodiments.

As has been explicitly explained heretofore, according to the liquid crystal display device of the present invention, it becomes possible to eliminate the reflection of light due to the signal lines.

Further, when the liquid crystal display device is constituted as a partial reflection type device (constitution including the backlight), the leaking of light from a backlight can be prevented.

What is claimed is:

1. A liquid crystal display device comprising:

a plurality of gate signal lines which are formed on an insulation substrate, a plurality of drain signal lines which are formed on the insulation substrate in such a way that the drain signal lines intersect the gate signal lines, thin film transistors which are connected to the gate signal lines and the drain signal lines and reflection electrodes which are connected to the thin film transistors, the thin film transistors and the reflection electrodes being formed on pixel regions which are surrounded by the respective signal lines, and sequential laminated bodies each of which is made of a light shielding film and a semiconductor layer, each sequential laminated body being formed covering such area as between the reflection electrode and the reflection electrode of other neighboring pixel region in such a way that the sequential laminated body is superposed on the sides of the reflection electrodes.

2. A liquid crystal display device according to claim 1, wherein a region disposed between the reflection electrode and a reflection electrode of other neighboring pixel region is disposed close to a region where the gate signal line is formed or a region where the drain signal line is formed.

3. A liquid crystal display device according to claim 2, wherein the light shielding film is disposed close to a region where the gate signal line is formed or a region where the drain signal line is formed.

4. A liquid crystal display device according to claim 1, wherein the light shielding film is formed on a layer on which the gate signal lines are formed and the semiconductor layer is formed on a layer on which a semiconductor layer of the thin film transistor is formed.

5. A liquid crystal display device according to claim 1, wherein the drain signal lines are formed in such a way that the drain signal lines have a full width thereof disposed below the reflection electrodes and are superposed on the reflection electrodes.

6. A liquid crystal display device according to claim 1, wherein between the reflection electrode and the reflection electrode of other neighboring pixel region, a boundary portion defined between color filters of different colors is positioned.

7. A liquid crystal display device according to claim 1, wherein between the reflection electrode and a reflection electrode of other neighboring pixel region, a green color filter or a blue color filter is formed.

8. A liquid crystal display device according to claim 1, wherein between the reflection electrode and a reflection electrode of other neighboring pixel region, a superposed portion of color filters of different colors is positioned.

9. A liquid crystal display device according to claim 1, wherein between the reflection electrode and a reflection electrode of other neighboring pixel region, a superposed portion of color filters of different colors is positioned, and at least one color filter is the green color filter or the blue color filter.

10. A liquid crystal display device according to claim 6, wherein the color filters are formed on other insulation substrate side which is arranged to face the insulation substrate so as to sandwich liquid crystal therebetween.

11. A liquid crystal display device according to claim 1, wherein the light shielding film and the gate signal lines are formed at the same time and the semiconductor layer and a semiconductor layer of the thin film transistor are formed at the same time.

* * * * *